United States Patent Office 3,383,433
Patented May 14, 1968

---

3,383,433
EPOXIDE RESINS CURED WITH PHE-
NOLIC NOVOLACS AND TRIAZOLES
OR TETRAZOLES
George A. Salensky, Metuchen, N.J., assignor to Union
Carbide Corporation, a corporation of New York
No Drawing. Filed Sept. 22, 1964, Ser. No. 398,394
9 Claims. (Cl. 260—831)

ABSTRACT OF THE DISCLOSURE

Epoxide resins may be cured with mixtures of phenolic novolac resins and a heterocyclic compound selected from triazoles and tetrazoles. The ratio of phenolic hydroxyl groups in the novolac to oxirane groups is from 0.5 to 1.5 respectively. In an example 100 pts. epoxide were combined with 41 pts. novolac and 0.75 pts. curing agent. The curing agents are exemplified by benzotriazole, 3-amino-1,2,4-triazole and pentylenetetrazole.

---

This invention relates to epoxide curing agents and to epoxide compositions containing same. More particularly, this invention relates to epoxide curing agents which, when admixed with epoxides, provide curable epoxide compositions characterized by excellent shelf life and which, when heated to elevated temperatures, cure to infusible products characterized by excellent physical, chemical and electrical properties.

The epoxide curing agents of this invention comprise (1) a phenolic novolac resin and (2) an imidazole, a triazole, or a tetrazole.

Any substituted or unsubstituted imidazole, triazole or tetrazole is suitable for purposes of this invention. An imidazole is a substituted or unsubstituted five membered heterocyclic compound having 2 nitrogen atoms and 3 carbon atoms in its ring. A triazole is a substituted or unsubstituted five membered heterocyclic compound having 3 nitrogen atoms and 2 carbon atoms in its ring. A tetrazole is a substituted or unsubstituted five membered heterocyclic compound having 4 nitrogen atoms and 1 carbon atom in its ring.

Among suitable imidazoles which can be specifically mentioned are the following: isoimidazole, imidazole, alkyl substituted imidazoles such as 2-methylimidazole 2-ethyl-4-methylimidazole, 2,4-dimethylimidazole, 2-butylimidazole, 2-heptadecenyl-4-methylimidazole, 2-undecenylimidazole, 1-vinyl-2-methylimidazole, 2-n-heptadecylimidazole, 2-n-heptadecyl-4-methylimidazole and the like, generally wherein each alkyl substituent has a maximum of 17 carbon atoms and preferably containing a maximum of 6 carbon atoms; aryl substituted imidazoles such as phenylimidazole,
benzylimidazole,
2-methyl-4,5-diphenylimidazole,
2,3,5-triphenylimidazole,
2-styrylimidazole,
1-(dodecyl benzyl)-2-methylimidazole,
2-(2-hydroxy-4-t-butylphenyl)-4,5-diphenylimidazole,
2-(2-methoxyphenyl)-4,5-diphenylimidazole,
2(3-hydroxyphenyl)-4,5-diphenylimidazole,
2(p-dimethylaminophenyl)-4,5-diphenylimidazole,
2(2-hydroxyphenyl)-4,5-diphenylimidazole,
di(4,5-diphenyl-2-imidazole)-benzene-1,4,
2-naphthyl-4,5-diphenylimidazole,
1-benzyl-2-methylimidazole,
2-p-methoxystyrylimidazole and the like, generally wherein each aryl substituent has a maximum of 10 carbon atoms and preferably wherein each aryl substituent has a maximum of 8 carbon atoms.

Illustrative of suitable triazoles are the following: triazole, 1,2,3 - benzotriazole, 3-aminotriazole and other substituted triazoles having the same substituents as noted for the imidazoles.

Illustrative of suitable tetrazoles are the following: pentylenetetrazole and other substituted tetrazoles having the same substituents as noted for the imidazoles.

The novolac resins are well known products usually acid-catalyzed phenol-aldehyde condensates or acid catalyzed phenol-ketone condensates which are prepared by condensing a phenol and an aldehyde or ketone in the presence of an acid such as oxalic acid, sulfuric acid and the like or in the presence of a metal salt of an acid such as zinc acetate, wherein the phenol is present in the reaction mixture in more than stoichiometric amounts. Novolac resins are generally fusible, brittle, grindable resins which can be converted to the infusible state by the addition thereto of a crosslinking agent such as a methylene generating agent such as hexamethylenetetramine.

Illustrative of suitable phenols which can be condensed with an aldehyde or ketone to produce suitable condensation products can be noted: phenol; dihydric phenols such as resorcinol; substituted phenols such as the alkylated phenols exemplary of which are m-cresol o-cresol, m-ethylphenol, m-n-propylphenol, m-isopropylphenol, m-n-hexylphenol, m-n-butyl phenol, m-sec-butyl phenol, m-tert-butyl phenol, m-amyl phenol and other like phenols, particularly those wherein the alkyl substituent contains from 1 to 6 carbon atoms inclusive, as well as the commercially available meta-cresol which contains small amounts of both the para and the ortho isomers; meta-substituted alkoxy phenols such as m-methoxy phenol, m-ethoxy phenol, m-n-propoxy phenol and the like, particularly those wherein the alkoxy group contains from 1 to 6 carbon atoms inclusive; meta-halogenated phenols such as m-chloro phenol, m-bromo phenol and the like. Also suitable are 2,2-bis(p-hydroxyphenyl)propane, bis (p-hydroxyphenyl)sulfone and the like.

Examples of aldehydes which can be condensed with the phenols listed above to produce the phenol-aldehyde condensates are: formaldehyde in any of its available forms, i.e., formalin, paraformaldehyde; furfural and the like, glyoxal and the like, acrolein and the like, benzaldehyde and the like.

Examples of suitable ketones are acetone, methylethyl ketone, acetophenone and the like.

For a detailed discussion of condensates produced from a phenol and an aldehyde or ketone methods for the production thereof, and suitable reactants, reference is made to the books: "Phenoplasts" by T. S. Carswell, published in 1947 by Interscience Publishers and "Chemie der Phenolharze" by K. Hultzsch, Springer Verlag, 1950, which are incorporated herein by reference.

Particularly desirable phenol-aldehyde condensates are those prepared by condensing formaldehyde with a phenol having the formula:

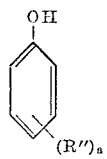

wherein $a$ is an integer having a value of 0 to 1 inclusive and R″ is a halogen atom, i.e., chlorine, bromine, iodine or fluorine, or an alkyl radical containing from 1 to 6 carbon atoms inclusive or an alkoxy radical containing from 1 to 6 carbon atoms inclusive.

In formulating the epoxide curing agents of this invention, the imidazole, triazole or tetrazole is simply admixed with the novolac resin in amounts of at least about 0.1 part by weight and generally in amounts of about 0.2 part by weight to about 25 parts by weight and preferably in amounts of about 1.5 parts by weight to about 6 parts by weight per 100 parts by weight novolac. More than about 25 parts by weight, per 100 parts by weight novolac. More than about 25 parts by weight, per 100 parts by weight novolac can be used but little advantage is to be actually gained.

The formulation of the curable epoxide compositions of this invention is conveniently accomplished by preparing the curing agent and adding the curing agent to the desired epoxide. Dry blending the individual powdered components can also be done if so desired.

The amount of curing agent used is sufficient to cure the epoxide to the thermoset state. As a rule, the curing agent is used in amounts to provide about 0.5 to about 1.5 phenolic hydroxyl groups per epoxide equivalent.

In those instances wherein the resultant epoxide composition is to be used in molding applications, the curing agent, epoxide and suitable filler are admixed to form a blended composition which is compacted at room tempera and then granulated to desired size. The granulated epoxide composition can then be molded to form such shaped articles as coil forms, capacitors, terminal blocks and the like.

As a rule, the filler which can be organic or inorganic such as nylon fiber, carbon black, silica, barytes, slate flour, clay and the like is used in amounts of about 30 to 80 percent by weight, based on the total weight of the composition. Also, mold release agents, colorants and the like can be added to the compositions.

The epoxide compositions are cured by heating to temperatures of about 125° C. to about 175° for 2 hours. Room temperature curing, which takes a number of days, is not practical.

The epoxides which can be utilized in accordance with this invention are those epoxides having more than one glycidyl group per molecule. These compounds, wherein the oxygen of the epoxy group is attached to vicinal carbon atoms, can be saturated or unsaturated, aliphatic, cycloaliphatic, or heterocyclic and can be substituted with substituents such as halogen atoms, alkyl groups, ether groups and the like.

Illustrative of suitable epoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, the heptaphenylols described in U.S. Patent 2,885,385 to A. G. Farnham. The phenols may contain substituents such as alkyl or aryl ring substituents or halogens, as exemplified by the alkyl resorcinols, tribromoresorcinols and the diphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis(p-hydroxyphenyl)-methane, 2,2 - bis(p - hydroxyphenyl)propane and dihydroxydiphenyl sulfone.

Process for the preparation of polyglycidyl ethers of polyhydric phenols is described in detail in the Bender et al. patent (supra) and U.S. Patent 2,943,095 to A. G. Farnham et al.

Particularly desirable for purposes of this invention are the polyglycidyl ethers of the bis(hydroxyphenyl)alkanes, for example the diglycidyl ether of 2,2-bis(p-hydroxyphenyl)propane and the diglycidyl ether of bis(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid and the like. polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl, m-phenylene diamine, p-phenylene diamine, 4,4'-diaminodiphenyl methane, or with amino phenols, such as p-amino phenol, 5-amino-1-n-naphthol, 4-amino resorcinol, 2-methyl-4-amino phenol, 2-chloro-4-amino phenol and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Patents 2,951,825 and 2,951,822 to N. H. Reinking and N. H. Reinking et al., respectively.

It is to be understood that all patents and literature references referred to in this specification are incorporated herein by reference.

The following examples further illustrate the present invention and are not intended to limit the scope thereof in any manner.

Example 1

This example illustrates the excellent shelf life of epoxide compositions containing the curing agents of this invention.

| Composition A | Parts by weight |
|---|---|
| Resin portion: | |
| Epoxidized phenol - formaldehyde condensate formed by reacting epichlorohydrin with a phenol-formaldehyde novolac resin having a molecular weight of about 600 and having 6 phenolic hydroxyl groups per molecule | 100 |
| Silica flour | 75 |
| Calcium stearate | 1 |
| Curing agent: | |
| Phenol-formaldehyde novolac resin | 41 |
| 2-methyl imidazole | 0.75 |
| Silica flour | 25 |
| Calcium stearate | 1 |

Each portion noted above was prepared separately by blending the ingredients using a mechanical agitator. Each portion was then micropulverized through a 3/32 inch screen and the pulverized portions blended using a rotating container. The composition was cold sintered using a Stokes preformer with a 2 inch die operating at a pressure of 20 tons. The sintered composition was then granulated to approximately a 12 mesh size in an Abbe mill.

Control 1.—This composition was prepared in identically the same manner as Composition A using the same materials, with the exception that methylene dianiline was used in lieu of the curing agent.

Composition A and Control 1 were tested in order to determine their relative cure speeds. The results of the tests are indicated below wherein a higher numerical ratio indicates that the composition being tested has advanced more closely to the infusible state.

The phenol-formaldehyde novolac resin referred to in this example was oxalic acid catalyzed, had a melocular weight of about 600 and had 6 phenolic hydroxyl groups per molecule.

This phenol-formaldehyde resin was epoxidized by reaction with epichlorohydrin in a manner described in U.S. Patent 2,943,095. This epoxidized novolac, noted in this example, had a molecular weight of about 1400 and an epoxy equivalent weight of about 211.

| Number of days aged at 40° C. | Ratio [1] | |
|---|---|---|
| | Composition A | Control 1 |
| 0 | | |
| 7 | 2.0 | 4.7 |
| 14 | 2.2 | 5.6 |
| 34 | 2.8 | 6.9 |
| 48 | 3.1 | 8.0 |

[1] Ratio=plasticity of composition aged at 40° C. for the time indicated/plasticity of composition 4 hours after preparation.
NOTE.—Plasticity=time in seconds for a 2-inch ASTMD-731-50 cup with a 10 percent fixed overcharge to close to a flash thickness of 8 mils when under a pressure of 4 kilopounds and at a temperature of 160° C.

Example 2

This example illustrates the fast cure speeds of the compositions of this invention effected by means of the curing agents. Cure speed was determined by means of "gel" time. This test was conducted by: placing a one gram sample of the desired composition on a hot plate which was at a temperature of 150° C. Each composition was stroked with a spatula and the time required to reach a "no string" condition noted. A "no string" condition is reached when there is no pulling of strings of material, by the spatula, from the main body of the composition. This time was noted as the initial gel time. Stroking of each composition was continued and the time at which the composition reached a "no noise" condition noted. This condition was reached when there was no audible noise on stroking of the composition. This time was noted as the final gel point. A spread of less than 10 seconds between the initial and the final gel time indicates a fast cure.

In each instance, compositions were formulated by admixing an epoxide (described in Example 1), a phenol-formaldehyde novolac (described in Example 1) and various triazoles, imidazoles and tetrazoles using the following relative amounts of materials: 12 parts by weight triazole, imidazole or tetrazole per 100 parts by weight novolac and 0.8 part by weight novolac per epoxide equivalent.

| | Gel time (seconds) |
|---|---|
| Composition B—3-amino-1,2,4-triazole | 29–34 |
| Composition C—benzotriazole | 33–38 |
| Composition D—2-methylimidazole | 7–7 |
| Composition E—4-methyl-2-ethylimidazole | 30–33 |
| Composition F—benzimidazole | 22–29 |
| Composition G—pentylenetetrazole | 42–45 |

In order to further indicate the "fast cure" effected using the curing agents of this invention, Control 2 was formulated containing the same equivalent weight phenol-formaldehyde novolac resin and epoxide. This composition was the same as Compositions B–G with the exception that it did not contain any heterocyclic nitrogen compound. This composition was also subjected to the "gel" test. It took 13 minutes for this composition to reach the "no string" condition. After a total of 23 minutes, this composition still had not reached the "no noise" condition.

Example 3

This example again illustrates the excellent shelf life effected using the curing catalysts of this invention and also the excellent cure speed at elevated temperatures.

Compositions were formulated in a manner described in Example 1 using the materials indicated below.

Control 2:                                            Parts by weight
    Epoxide-phenylglycidyl ether _____ 100
    Phenol _____ 50
Control 3:
    Epoxide-phenylglycidyl ether _____ 100
    Phenol _____ 50
    Methylene bisdimethylaniline _____ 3
Composition H:
    Epoxide-phenylglycidyl ether _____ 100
    Phenol _____ 50
    2-methyl imidazole _____ 1

The "reactivity" of each composition was determined by the disappearance of the epoxy groups and reported on the basis of one epoxy group per gram mole.

| Elapsed time | Control 2 | | | Control 3 | | | Composition E | | |
|---|---|---|---|---|---|---|---|---|---|
| | 25° C. | 40° C. | 100° C. | 25° C. | 40° C. | 100° C. | 25° C. | 40° C. | 100° C. |
| 0 | 225.5 | | | 234 | | | 228 | | |
| ½ hour | | | 232 | | | 670 | | | 705 |
| 1 hour | | | 227 | | | 1,110 | | | 2,500 |
| 2 days | 225.5 | 235 | | 297 | 736 | | 263 | 475 | |
| 6 days | 225.5 | 227 | | 440 | 1,440 | | 332 | 1,815 | |

Example 4

In order to further illustrate the excellent properties of the compositions of this invention, various tests were conducted using Composition A and Control 1. Results are tabulated as follows:

| Tests | Control 1 | Composition A |
|---|---|---|
| Heat distortion ASTMD-648-56, ° F | 280 | 350 |
| Izod impact ASTMD-256-56, ft.-lb./inch | 0.35 | 0.33 |
| Flexural strength ASTMD-790-58T, p.s.i | 8,400 | 11,348 |
| Flexural modulus ASTMD-790-58T, p.s.i | $9.0 \times 10^5$ | $12.6 \times 10^5$ |
| Rockwell hardness (M scale) ASTMD-785-60T | 101 | 99 |
| Mold shrinkage (inch/inch) ASTMD-955 | 0.0106 | 0.0066 |
| Gravimetric loss at 400° F. for 100 hrs. (¼ inch by ½ inch by 5 inches—bar), percent | 2.6 | 0.35 |
| AMOE 320° F.—2 mins., p.s.i | 7,000 | 17,000 |

AMOE=Apparent modulus of elasticity—was carried out by molding a bar ⅛ inch by 1 inch by 5 inches at 320° F. under a molding cycle of 2 minutes, at 1,000 p.s.i. pressure. The bar was then discharged directly into a flexural test jig affixed to the molding press, and the stress-strain flexural curve obtained the slope of the stress-strain flexural curve is reported as AMOE.

As indicated by the AMOE results, the compositions of this invention have excellent hot stiffness.

What is claimed is:
1. A curable composition comprising an epoxide having more than one glycidyl group per molecule and, in an amount sufficient to provide about 0.5 to about 1.5 phenolic hydroxyl groups per epoxide equivalent, a curing agent consisting essentially of a phenolic novolac resin and a heterocyclic nitrogen compound selected from the group consisting of triazoles and tetrazoles, said heterocyclic nitrogen compound being present in said curing agent in at least about 0.1 part by weight per 100 parts by weight of said novolac resin.

2. The cured product of the composition defined in claim 1.

3. A curable composition as defined in claim 1 wherein the epoxide is a polyglycidyl ether of a bis(p-hydroxyphenyl)alkane.

4. A curable composition as defined in claim 1 wherein the epoxide is the diglycidyl ether of 2,2-bis(p-hydroxyphenyl)propane.

5. A curable composition as defined in claim 1 wherein the epoxide is the polyglycidyl ether of an acid-catalyzed phenolformaldehyde resin.

6. A curable composition as defined in claim 1 wherein the heterocyclic nitrogen compound is 3-amino-1,2,4-triazole.

7. A curable composition as defined in claim 1 wherein the heterocyclic nitrogen compound is benzotriazole.

8. A curable composition as defined in claim 1 wherein the heterocyclic nitrogen compound is pentylenetetrazole.

9. A curable molding comprising an epoxide having more than one glycidyl group per molecule, a filler, and, in an amount sufficient to provide about 0.5 to about 1.5 phenolic hydroxyl groups per epoxide equivalent, a curing catalyst consisting essentially of a phenolic novolac resin and a heterocyclic nitrogen compound selected from the group consisting of triazoles and tetrazoles, said heterocyclic nitrogen compound being present in said curing agent in at least about 0.1 part by weight per 100 parts by weight of said novolac resin.

References Cited
UNITED STATES PATENTS

| | | | |
|---|---|---|---|
| 3,147,705 | 9/1964 | Broderick | 260—23 |
| 3,200,172 | 8/1965 | Renner | 260—831 |

OTHER REFERENCES

Houdry Process Corp., Imidazoles.

MURRAY TILLMAN, *Primary Examiner.*

SAMUEL H. BLECH, *Examiner.*

PAUL LIEBERMAN, *Assistant Examiner.*